June 16, 1925.

H. A. MEISSNER

ELASTIC FLUID TURBINE

Filed Dec. 17, 1924

1,542,402

WITNESSES:

H. A. Meissner
INVENTOR

BY
ATTORNEY

Patented June 16, 1925.

1,542,402

UNITED STATES PATENT OFFICE.

HERMAN A. MEISSNER, OF ST. PETERSBURG, FLORIDA, ASSIGNOR TO WESTINGHOUSE ELECTRIC & MANUFACTURING COMPANY, A CORPORATION OF PENNSYLVANIA.

ELASTIC-FLUID TURBINE.

Application filed December 17, 1924. Serial No. 756,423.

*To all whom it may concern:*

Be it known that I, HERMAN A. MEISSNER, a citizen of the United States, and a resident of St. Petersburg, in the county of Hillsborough and State of Florida, have invented a new and useful Improvement in Elastic-Fluid Turbines, of which the following is a specification.

My invention relates to elastic fluid turbines, more specifically to the blading thereof, and has for its object the provision of a blade lashing which shall be simple of design, easily applied, and which shall be effective to brace the blades and to minimize the vibration thereof.

Figure 1:
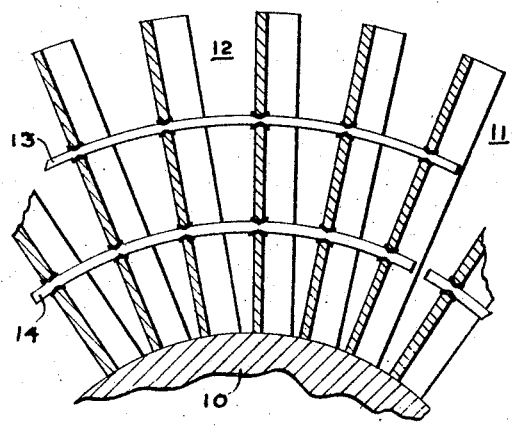
Figure 2:
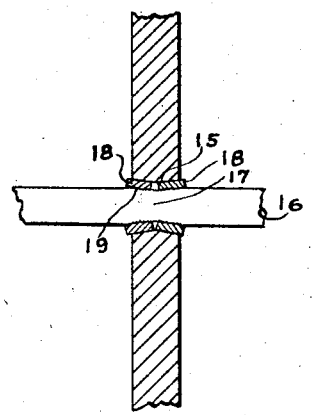
Figure 4:
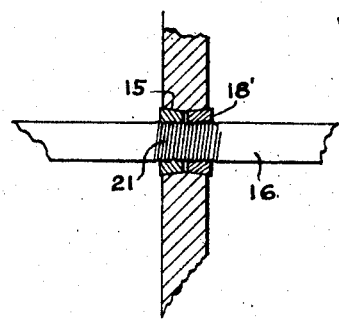
Figure 3:
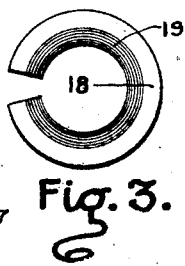
Figure 6:
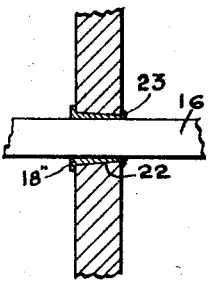
Figure 5:
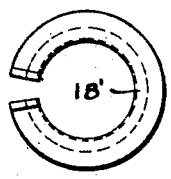

Apparatus made in accordance with my invention is illustrated in the accompanying drawings, forming a part of this specification, in which Fig. 1 is a fragmentary sectional view of a turbine rotor with a row of blades mounted thereon and having my improved lashing means applied thereto; Fig. 2 is an enlarged fragmentary sectional view showing the means for securing the lashing to the blades; Fig. 3 is an enlarged end view of a wedging means used in my invention; Fig. 4 illustrates a modified form of my invention; Fig. 5 is an enlarged end view of the wedge means used with the modification illustrated in Fig. 4, and Fig. 6 illustrates a further modification of my invention.

As is well understood in the art to which my invention relates, it is necessary to apply some form of bracing or lashing to turbine blades, especially to relatively long blades, in order to minimize vibration thereof and to add strength to the blading structure.

Turbine blade lashing, as heretofore known to me, has been secured to the turbine blades either by means of brazing or soldering the lashing to the blades; or the lashing, usually in the form of wire, has been threaded through holes in the blades and, after assembly, the lashing has been deformed by some mechanical means between blades in a row in order to engage the lashing with the blades. Difficulties have been encountered with the first-mentioned method, especially with blades of certain compositions, due to the fact that the material employed in the blades does not readily lend itself to the process of soldering or brazing. Furthermore, the heat applied to the blade, in order to solder or braze the lashing thereto, may have an injurious effect on the mechanical properties of the blade. Difficulties have also been encountered in deforming lashing between blades in a row so as to tightly engage the blades and the lashing at the point of juncture thereof, due to the inaccessibility of the lashing after assembly with the blades.

It has also been proposed to provide individual lashing pieces between adjacent blades and rivet or otherwise secure the lashing pieces to the blades after assembly. While this method provides a very dependable form of lashing its application is manifestly difficult and expensive.

In accordance with my invention, I provide each of the blades with one or more holes and thread the lashing wire through the holes. The holes in the blades are made somewhat larger in diameter than the diameter of the lashing wire and the lashing wire is wedged in the blades after assembly. The wedge which I employ is in the form of a split ring which may be sprung over the wire after assembly and driven or otherwise forced between the blades and the lashing wire, as will be more particularly explained hereinafter in this specification.

Referring now to the drawings for a more detailed description of my invention I show in Fig. 1 a fragment of a blade carrying element 10 such as a rotor, having a row of blades 11 mounted thereon. While I illustrate only a turbine rotor which carries the moving blades of the turbine, it will be obvious that the invention is equally applicable to any of the blades of the turbine whether moving or stationary. As is well understood in the turbine art, the blading thereof is usually secured to a blade row in a convenient number of segments of blades in order to avoid difficulties due to expansion and contraction of the blade row at varying working temperatures. At 12 I show a segment of six blades having my improved lashing means applied thereto. In this example I show two rows of lashing 13 and 14 applied to the blades, though the number of rows of lashing will depend upon the length of the blades and the conditions of speed, temperature, etc., under which they operate. An enlarged view of the lashing secured to a blade is shown in Fig. 2. Each of the blades is provided with a hole 15 having a wall inclining inwardly from each side. The lashing wire is shown at 16. As may be seen, the lashing wire 16 is reduced in section where it passes through the blades and is given a shape complementary to the hole in the blade. The hole 15 is made larger in diameter than the diameter of the lashing wire 16 in order to accommodate a wedge employed to hold the lashing and blades rigid with respect to each other.

After being threaded through the blades a split wedge ring 18 of frusto-conical shape, as illustrated in Fig. 3, is sprung over the wire on each side of the blade and is driven into the hole in the blade between the lashing and the blade until the lashing and the blade are firmly engaged by the wedge 18. The wedge ring 18 is made of resilient material and has an outside diameter somewhat larger than the diameter of the hole 15, so that it more tightly engages the side of the hole by reason of its resiliency. Both the lashing wire and the interior of the wedge ring 18 may be roughened as shown at 19 in order to secure a better engagement therebetween.

In Figs. 4 and 5 I show the lashing wire as being threaded at 21 where it passes through the hole 15 in the blade. The wedge ring 18′ is similarly provided with interior threads. In assembling the blading and lashing in accordance with this modification of my invention, I thread the lashing wire through the hole in the blade, spring the rings 18′ over the lashing wire 16 and screw the wedge rings 18′ from each side of the blade over the lashing wire 16 until they tightly engage the blades.

In Fig. 6, I show a further modified form of my invention in which a hole 22 having its wall inclined in one direction only, is provided through the blade. In this modification, a single split wedge ring 18″ is sprung over the lashing wire 16 and driven into the hole 22 around the lashing wire 16 until the lashing wire and the blade are tightly engaged by the wedge ring. During the driving operation the wedge ring 18″ is bent over at the opposite end from which it is driven as shown at 23, thus forming a sturdy unitary structure.

From the foregoing it will be apparent that I have invented an improved method of securing lashing to turbine blades which is efficient, easy of application and which has no injurious effect upon the blading structure.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. Means for securing a lashing wire to a turbine blade having a hole therein comprising a wedge adapted to engage with the lashing wire and with the side of the hole in the blade.

2. Means for securing a lashing wire to a turbine blade having a hole therein, said hole having inclined walls, comprising a resilient wedge-shaped ring surrounding the lashing wire and engaging the wire and the side of the hole in the blade.

3. Means for securing a lashing wire to a turbine blade having a hole therein, said hole having inclined walls, comprising a wedge-shaped ring surrounding the lashing wire and driven into the hole so as to engage the lashing wire and the side of the hole in the blade.

4. In a turbine, a blade-carrying element, a blade mounted thereon and having a hole through an intermediate point thereof, a lashing wire threaded through the hole, and wedge means between the wire and the blade.

5. In a turbine, a blade-carrying element, a plurality of blades mounted in a row on the blade-carrying element, each of said blades having a hole through an intermediate point thereof, a lashing wire threaded through the holes of adjacent blades in a row, and wedge means between the lashing wire and the blades.

6. In a turbine, a blade-carrying element, a plurality of blades mounted on said element, each of said blades having a hole through an intermediate point thereof, lashing means extending through the hole, and hollow frustro-conical shaped wedge means embracing the lashing means and tightly engaging the blade and the lashing means.

7. In a turbine, a blade-carrying element, a plurality of blades mounted on said element, each of said blades having a hole through an intermediate point thereof, lashing means extending through the hole, and resilient wedge shaped rings embracing the lashing means and engaging the lashing means and the blade.

In testimony whereof, I have hereunto subscribed my name this 21st day of November, 1924.

HERMAN A. MEISSNER.